United States Patent
Wolf

(10) Patent No.: US 9,643,663 B2
(45) Date of Patent: May 9, 2017

(54) AIR GUIDING DEVICE, VEHICLE AND METHOD FOR OPERATING AN AIR GUIDING DEVICE

(71) Applicant: Dr. Ing. h.c. F. Porsche Aktiengesellschaft, Stuttgart (DE)

(72) Inventor: Thomas Wolf, Leonberg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/805,516

(22) Filed: Jul. 22, 2015

(65) Prior Publication Data

US 2016/0023693 A1    Jan. 28, 2016

(30) Foreign Application Priority Data

Jul. 23, 2014    (DE) .................. 10 2014 110 394

(51) Int. Cl.

| | |
|---|---|
| *B62D 35/00* | (2006.01) |
| *B60L 11/18* | (2006.01) |
| *B62D 25/20* | (2006.01) |
| *B60K 1/04* | (2006.01) |
| *B60K 11/02* | (2006.01) |
| *B60K 1/00* | (2006.01) |

(52) U.S. Cl.
CPC .............. *B62D 35/007* (2013.01); *B60K 1/04* (2013.01); *B60K 11/02* (2013.01); *B60L 11/1874* (2013.01); *B60L 11/1877* (2013.01); *B62D 25/20* (2013.01); *B60K 2001/005* (2013.01); *B60K 2001/0438* (2013.01)

(58) Field of Classification Search
CPC ... B62D 35/007; B62D 25/20; B60L 11/1874; B60L 11/1877; B60K 1/04; B60K 11/02; B60K 2001/005; B60K 2001/0438
See application file for complete search history.

(56) References Cited

U.S. PATENT DOCUMENTS

| | | | |
|---|---|---|---|
| 5,165,751 A * | 11/1992 | Matsumoto | B62D 35/007 296/180.5 |
| 7,387,331 B2 * | 6/2008 | Froeschle | B62D 35/007 180/903 |
| 8,360,507 B2 * | 1/2013 | Benton | B62D 35/001 296/180.1 |
| 2010/0078963 A1 * | 4/2010 | Dittrich | B60J 7/22 296/180.5 |

* cited by examiner

*Primary Examiner* — Glenn Dayoan
*Assistant Examiner* — Melissa A Black
(74) *Attorney, Agent, or Firm* — Gerald E. Hespos; Michael J. Porco; Matthew T. Hespos

(57) ABSTRACT

An air guiding device for a vehicle has a first air guiding element and a second air guiding element. A first hinge mechanism connects the first air guiding element hingedly to a rear of the vehicle, and a second hinge mechanism connects the second air guiding element hingedly to the first air guiding element.

9 Claims, 1 Drawing Sheet

AIR GUIDING DEVICE, VEHICLE AND METHOD FOR OPERATING AN AIR GUIDING DEVICE

CROSS REFERENCE TO RELATED APPLICATION

This application claims priority under 35 USC 119 to German Patent Appl. No. 10 2014 110 394.7 filed on Jul. 23, 2014, the entire disclosure of which is incorporated herein by reference.

BACKGROUND

1. Field of the Invention

The invention relates to an air guiding device for a vehicle.

2. Description of the Related Art

Air flowing over the body of a hatchback vehicle is directed down in the rear region and therefore results in a relatively high aerodynamic drag and in an increased lifting force in the region of the rear axle.

Air guiding devices, such as wings or spoilers, are used in the prior art to influence the air flow of sports cars in an advantageous manner and to improve the aerodynamics of the vehicle body. Some air guiding devices are motorized to move or deploy into an operative position only when required, i.e. when a certain speed is exceeded. However, during slow travel or when the vehicle is at a standstill, the air guiding device is moved into an inconspicuous inoperative position, in which the lines and the esthetics of the vehicle are not affected adversely by the air guiding device.

Movable air guiding devices of this type typically are arranged on the vehicle rear and therefore generally have only a small construction depth. As a result, the downwardly sloping rear surface and the downwardly directed air flow are inhibited only directly at the rear end. This short construction depth permits simple pivoting away of the air guiding device into the inoperative position, but is disadvantageous aerodynamically.

An object of the invention is to provide an air guiding device for a vehicle that improves the aerodynamics of the vehicle, particularly in the case of hatchback vehicles, and with which an aesthetically attractive external appearance without dominating air deflecting structures.

SUMMARY

The invention relates to an air guiding device for a vehicle. The air guiding device has first and second air guiding elements. A first hinge mechanism connects the first air guiding element hingedly to a rear of the vehicle, and a second hinge mechanism connects the second air guiding element hingedly to the first air guiding element.

The air guiding device of the invention has the advantage over the prior art in that it comprises both a pivotable first air guiding element and a separate pivotable second air guiding element. The air guiding device in the inoperative position can thereby be adapted comparatively readily to the contour profile of the hatchback, thus enabling an elegant and esthetically attractive external appearance of the vehicle. However, the two separate air guiding elements enable the air guiding device to have a set operative position that provides a greater effective surface for deflecting the air and therefore for improves the aerodynamics of the vehicle.

The first hinge mechanism may have a first axis of rotation that runs parallel to a horizontal direction and is perpendicular to the forward direction of travel of the vehicle. Thus, the first air guiding element is pivotable about the first axis of rotation relative to the rear of the vehicle. The second hinge mechanism may have a second axis of rotation that runs parallel to the horizontal direction so that the second air guiding element is pivotable about the second axis of rotation relative to the first air guiding element. The setting angles of the two air guiding elements can be set separately from each other and individually so that the degree of air deflection can be set optimally and adjusted at any time and in particular at any speed of the vehicle.

The first and second air guiding elements may comprise substantially flat wing elements. Effective deflection of the air stream over the vehicle body can therefore advantageously be achieved.

The invention also relates to a hatchback vehicle having the above-described air guiding device.

The first and second air guiding elements may be pivoted down into the contour profile of the hatchback in an inoperative position of the air guiding device. The external appearance of the vehicle therefore advantageously is influenced as little as possible by the air guiding device.

The first and the second air guiding device may be pivoted into a substantially horizontal position above the contour profile of the hatchback in a first operative position of the air guiding device. The horizontal position of the first and second air guiding elements advantageously achieves as high a shape of the rear as possible, with the rear shape sloping down only minimally, if at all. The hatchback vehicle therefore can be transferred in terms of flow during driving into an aerodynamically significantly more favorable fast back vehicle or high back vehicle (similar to a station wagon). In the first operative position, the aerodynamic drag and the lift in the region of the rear axle of the vehicle advantageously are reduced significantly.

In a second operative position of the air guiding device, the first air guiding element is pivoted into the horizontal position and the second air guiding element is pivoted into a setting position set beyond the horizontal position. The additionally set second air guiding element advantageously causes a force that is opposed to the lifting force and presses the vehicle in the region of the rear axle toward the road surface to improve traction of the rear wheels. The driving performances of the vehicle can therefore be improved considerably. This is of great interest in particular for sports cars.

The two air guiding elements may be formed separately from each other in so that two extension mechanisms may be provided, and therefore the second air guiding element and the first air guiding element can be adjusted independently of each other and/or can be activated via suitable means.

The invention further relates to a method for operating an air guiding device of the above described vehicle. The method moves the air guiding device between the inoperative position, the first operative position and the second operative position depending on the speed of the vehicle. The air guiding device can therefore be adapted advantageously in a flexible manner to the respective driving situation and to the current speed of the vehicle. The air guiding device may be adjusted discretely or continuously between the three positions: the inoperative position, the first operative position and second operative position.

The method may be carried out so that the air guiding device is operated in the inoperative position below a first limit speed, the air guiding device is pivoted into the first operative position above the first limit speed, and the air guiding device is pivoted into the second operative position above a second limit speed. The value of the first and second limit speeds may be predetermined and fixed or alternatively may be ascertained actively from sensor data of the vehicle.

Further details, features and advantages of the invention are explained below with reference to the drawings. The drawings merely illustrate exemplary embodiments of the invention but do not restrict the essential inventive concept.

DETAILED DESCRIPTION

Figure 1A:
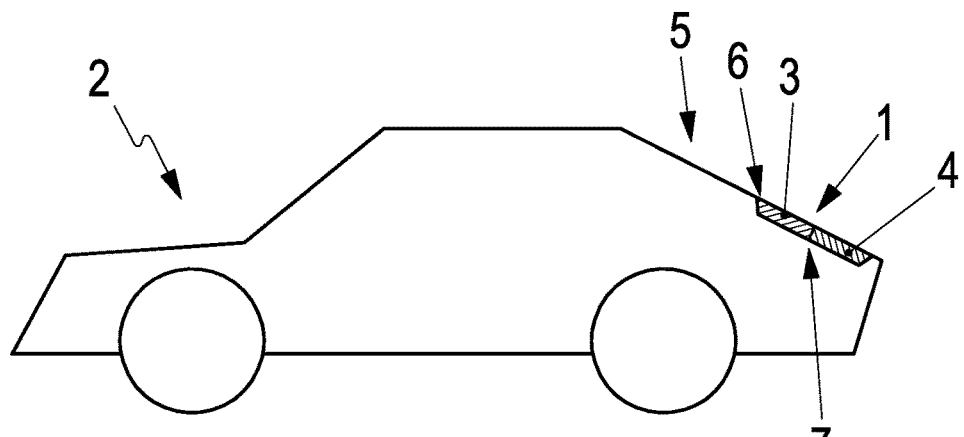
FIG. 1a is a schematic side view of an air guiding device of a vehicle according to an embodiment of the invention in an inoperative position.

FIG. 1a is a schematic side view of an air guiding device 1 of a vehicle 2. The vehicle 2 has a rear hatchback in the region of the air guiding device 1.

The air guiding device 1 is of two-part design and accordingly has a first air guiding element 3 and a second air guiding element 4 that is separate from the first air guiding element 3. The front end of the first air guiding element 3 is fastened pivotably to the rear of the vehicle via a first hinge mechanism 6. The front end of the second air guiding element 4 is fastened pivotably to the rear end of the first air guiding element 3 by means of a second hinge mechanism 7. The first and second air guiding elements 3 and 4 are flat wing elements for deflecting or diverting the airflow caused by the movement of the vehicle 2 (relative wind) over the body of the vehicle 2.

The first air guiding element 3 is pivotable by the first hinge mechanism 6 relative to the rear 5 about a first axis of rotation that runs parallel to a horizontal direction and perpendicular to the forward direction of travel of the vehicle. The second air guiding element 4 is pivotable the second hinge mechanism 7 relative to both the rear 5 and the first air guiding element 3 about a second axis of rotation that likewise runs parallel to the horizontal direction. The respective pivoting takes place in a motorized manner, preferably by corresponding electric motors.

The air guiding device 1 is movable between an inoperative position, a first operative position and a second inoperative position. FIG. 1a illustrates the inoperative position. In this case, the first and second air guiding elements 3, 4 fit lowered onto the rear portion of the vehicle, and therefore the two air guiding elements 3, 4 fit inconspicuously into the contour profile of the rear 5 and have as little effect as possible on the external appearance of the vehicle 2. In this inoperative position, the air guiding device 1 does not deflect the airflow. The air guiding device 1 is transferred into the inoperative position when the vehicle 2 is at a standstill or is travelling slowly, i.e. when a first limit speed is not exceeded.

Figure 1B:
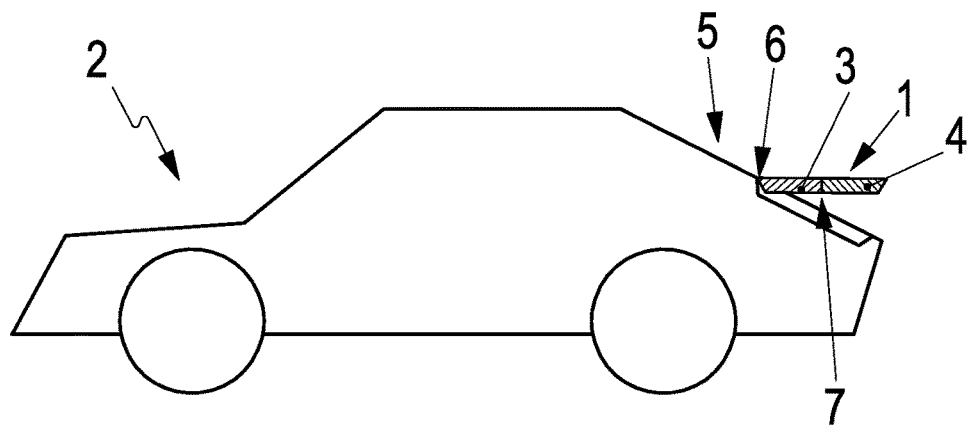
FIG. 1b is a schematic side view of the air guiding device in a first operative position.

FIG. 1b is a schematic side view of the air guiding device 1 that has been moved from the inoperative position into the first operative position.

In the first operative position, the first air guiding element 3 is pivoted up about the first axis of rotation into a horizontal position. If necessary, the second air guiding element 4 also is pivoted about the second axis of rotation into a horizontal position. The first and the second air guiding elements 3, 4 are in the first operative position, i.e. in a substantially horizontal orientation, so that the hatchback of the vehicle 2 is at least partially approximated in terms of flow to a high back. The aerodynamic drag and the lifting force in the region of the rear axle of the vehicle 2 are reduced to improve the aerodynamics of the vehicle 2.

The air guiding device 1 may be transferred automatically from the inoperative position into the first operative position when the speed of the vehicle 2 exceeds the first limit speed.

Figure 1C:
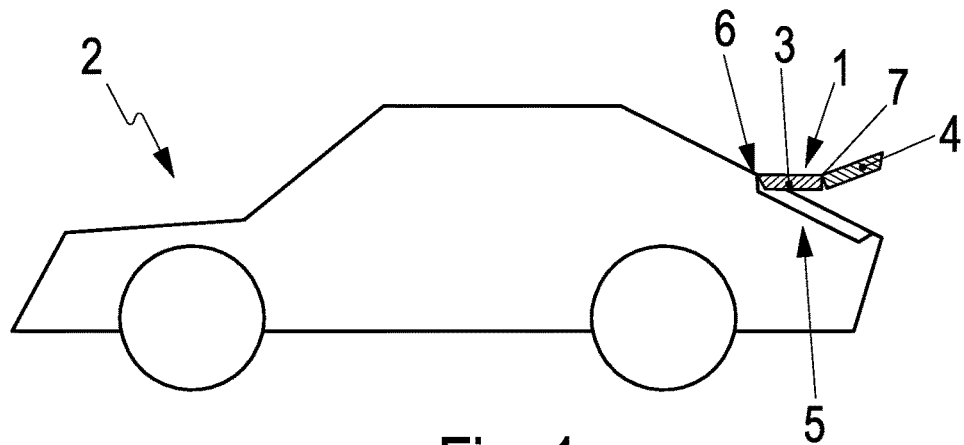
FIG. 1c is a schematic side view of the air guiding device in a second operative position.

FIG. 1c is a schematic side view of the air guiding device 1 of the vehicle 2 that has been moved from the orientations shown in FIGS. 1a and 1c into a second operative position.

The second operative position differs from the first operative position of FIG. 1b in that the second air guiding element 4 is pivoted farther up about the second axis of rotation beyond the horizontal alignment of the first operative position. Thus, a contact pressure directed toward the road surface is produced in the region of the rear axle of the vehicle 2, and the traction of the vehicle 1 is improved.

The air guiding device 1 may be transferred automatically from the first operative position into the second operative position when the speed of the vehicle 2 exceeds the second limit speed.

What is claimed is:

1. An air guiding device for a vehicle, the air guiding device comprising: a first air guiding element having opposite front and rear ends, the front end of the first air guiding element being connected hingedly to a rear of the vehicle by a first hinge mechanism with a first axis of rotation that runs parallel to a horizontal direction and perpendicular to a forward direction of travel of the vehicle; and a second air guiding element having opposite front and rear ends, the front end of the second air guiding element being connected hingedly to the rear end of the first air guiding element by a second hinge mechanism that is substantially parallel to the first hinge mechanism, the first hinge mechanism being operative to rotate the first air guiding element about the first axis of rotation relative to the rear of the vehicle and the second hinge mechanism being operative to rotate the second air guiding element relative to the first air guiding element.

2. The air guiding device of claim 1, wherein the second hinge mechanism has a second axis of rotation that runs parallel to the horizontal direction, the second air guiding element being pivotable about the second axis of rotation relative to the first air guiding element.

3. The air guiding device of claim 1, wherein the first and second air guiding elements have substantially flat wing elements.

4. A vehicle having a hatchback and an air guiding device arranged on the hatchback, the air guiding device comprising: a first air guiding element having opposite front and rear ends, the front end of the first air guiding element being connected hingedly to a rear of the vehicle by a first hinge mechanism; and a second air guiding element having opposite front and rear ends, the front end of the second air guiding element being connected hingedly to the rear end of the first air guiding element by a second hinge mechanism that is substantially parallel to the first hinge mechanism, the first hinge mechanism being operative to rotate the first air guiding element relative to the vehicle and the second hinge mechanism being operative to rotate the second air guiding element relative to the first air guiding element.

5. The vehicle of claim 4, wherein, in an inoperative position of the air guiding device, the first and the second air guiding element are pivoted down into a contour profile of the hatchback.

6. The vehicle of claim 5, wherein, in a first operative position of the air guiding device, the first and second air guiding elements are pivoted into substantially horizontal positions above the contour profile of the hatchback.

7. The vehicle of claim 6, wherein, in a second operative position of the air guiding device, the first air guiding element is pivoted into the horizontal position and the second air guiding element is pivoted into a setting position set beyond the horizontal position.

8. A method for operating a vehicle that has a hatchback and an air guiding device that includes a first air guiding element having opposite front and rear ends, the front end of the first air guiding element being connected hingedly to a rear of the vehicle by a first hinge mechanism; and a second air guiding element having opposite front and rear ends, the front end of the second air guiding element being connected hingedly to the rear end of the first air guiding element by a second hinge mechanism that is substantially parallel to the first hinge mechanism, the method comprising:

sensing a speed of the vehicle; and moving the air guiding device between:

an inoperative position where the first and the second air guiding element are pivoted down into a contour profile of the hatchback, a first operative position where the first and second air guiding elements are pivoted into substantially horizontal positions above the contour profile of the hatchback, and a second operative position where the first air guiding element is pivoted into the horizontal position and the second air guiding element is pivoted into a setting position set beyond the horizontal position, with the moving of the air guiding depending on the sensed speed of the vehicle.

9. The method of claim 8, further comprising keeping the air guiding device in the inoperative position below a first limit speed, pivoting the air guiding device into the first operative position above the first limit speed, and pivoting the air guiding device into the second operative position above a second limit speed.

\* \* \* \* \*